United States Patent Office 2,710,298
Patented June 7, 1955

2,710,298

BIOCYTIN AND PROCESS OF MANUFACTURE AND INTERMEDIATES

Donald E. Wolf, Princeton, and Karl Folkers, Plainfield, N. J., assignors to Merck & Co., Inc., Rahway, N. J., a corporation of New Jersey No Drawing. Application October 12, 1951, Serial No. 251,133

5 Claims. (Cl. 260—309.7)

This invention relates to a novel process for the preparation of ε-N-(D-biotinyl)-L-lysine, also known as biocytin.

Biocytin is a growth-promoting substance related to biotin. Heretofore, it has been isolated from such sources as autolyzed yeast extracts. However, this procedure is long and tedious and furnishes only minute quantities of biocytin relative to the amount of starting material.

It is an object of our invention to provide a process for the preparation of ε-N-(D-biotinyl)-L-lysine from readily available starting materials, which makes possible the ready preparation of adequate amounts of this growth-promoting substance.

Regarded in certain of its broader aspects the process in accordance with our invention involves reacting ε-N-carbobenzoxy-L-lysine with a formylating agent to form ε-N-carbobenzoxy-α-N-formyl-L-lysine, hydrogenating the latter compound to form α-N-formyl-L-lysine, condensing the product thus obtained with biotin acid halide to form ε-N-(D-biotinyl)-α-N-formyl-L-lysine and hydrolyzing the same with a non-oxidizing dilute mineral acid to form ε-N-(D-biotinyl)-L-lysine.

In preparing ε-N-(D-biotinyl)-L-lysine (biocytin) we utilize as one of the starting materials ε-N-carbobenzoxy-L-lysine which has the structural formula

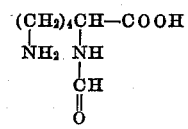

We have found that this compound, namely, ε-N-carbobenzoxy-L-lysine, may be caused to react with a formylating agent, such as formic acid and acetic anhydride. The reaction takes place at room temperature in about twenty hours, although the reaction is operative within the range of 5–50 hours. Sufficient acetic anhydride is employed to maintain anhydrous conditions during the reaction, and an excess of acetic anhydride would not be harmful. The resulting product, ε-N-carbobenzoxy-α-N-formyl-L-lysine, a compound having the structural formula

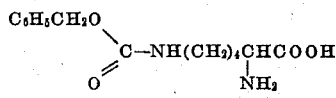

is recovered as a solid by the addition of water to the reaction mixture. This product may be purified or charged directly to the next step.

The hydrogenation of ε-N-carbobenzoxy-α-N-formyl-L-lysine thus obtained to remove the ε-N-carbobenzoxy group can be carried out by reaction with hydrogen under atmospheric or superatmospheric pressure in the presence of the usual hydrogenation catalysts, such as platinum, palladium, Raney nickel or the like. In the preferred embodiment of our invention, the hydrogenation is readily effected with palladium supported on charcoal, at a pressure of 40 pounds.

This reaction results in the formation of α-N-formyl-L-lysine having the following formula:

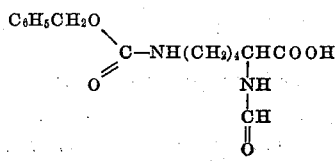

The above described α-N-formyl-L-lysine may be condensed with biotin acid halide in the presence of a condensing agent, such as pyridine or an aqueous alkaline solution. Other alkaline compounds, such as collidine and quinoline, would be operable. The condensation may be accomplished by adding α-N-formyl-L-lysine to biotin acid halide, having the following formula:

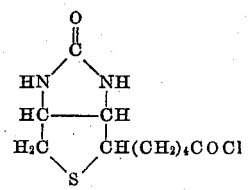

The reaction mixture is chilled and cold dry pyridine added. The reaction mixture is stirred and held at 0°–5° C. for about twenty minutes and then allowed to warm to room temperature over a period of forty minutes.

Alternatively, the condensation can be carried out by adding biotin acid halide to an ice cold aqueous alkaline solution of α-N-formyl-L-lysine.

Either of these reactions results in the formation of ε-N-(D-biotinyl)-α-N-formyl-L-lysine, having the structural formula:

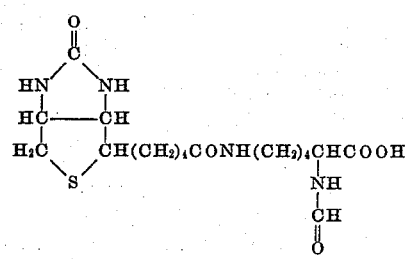

Purification of the above compound may be accomplished by precipitation of the benzylamine salt of ε-N-(D-biotinyl)-α-N-formyl-L-lysine.

The formyl group is removed from the ε-N-(D-biotinyl)-α-N-formyl-L-lysine compound by treating said compound with hydrochloric acid at about 65° C. about thirty minutes. Other dilute non-oxidizing mineral acids may be used in place of hydrochloric acid, such as sulfuric acid or phosphoric acid. We prefer to use hydrochloric acid, however, because of the ease of removal of the chloride ion. This reaction results in the formation of ε-N-(D-biotinyl)-L-lysine, having the structural formula:

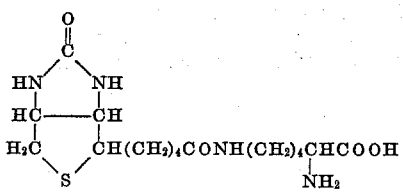

It is advantageous, if very pure biocytin is desired, to purify the product by countercurrent distribution methods.

It is, of course, possible to apply our synthesis to the D- or DL-form of lysine. L-lysine was employed by us since we wished to obtain the natural form of biocytin as the end product of the reaction.

The following example illustrates specific embodiments of our invention:

EXAMPLE

Preparation of α-N-formyl-L-lysine

Twenty-nine and five-tenths grams of ε-N-carbobenzoxy-L-lysine was dissolved in a mixture of 180 ml. of 98% formic acid and 20 ml. acetic anhydride. This solution was allowed to stand at room temperature about 20 hours under anhydrous conditions. About 25% by volume of water was then added, and the solution concentrated in vacuo to a clear oil. The ε-N-carbobenzoxy-α-N-formyl-L-lysine oil was dissolved in methanol and hydrogenated at 40 pounds pressure and at room temperature, using 35 g. of palladium on Darco as catalyst. The catalyst was removed by centrifugation and filtration, washed with slightly ammoniacal methanol, and the combined filtrate and washings neutralized with glacial acetic acid. The reaction mixture was concentrated in vacuo to an almost colorless oil consisting of α-N-formyl-L-lysine. The oil was dissolved in a mixture of water and methanol, and acetone added to precipitate colorless crystals of α-N-formyl-L-lysine having a melting point of 193–193.5° C.

*Analysis.*—Calculated for $C_7H_{14}O_3N_2$: C, 48.26; H, 8.05; N, 16.09. Found: C, 48.60; H, 8.00; N, 16.03.

Preparation of ε-N-(D-biotinyl)-α-N-formyl-L-lysine

Thirteen and five-tenths grams of biotin was converted to the acid chloride. To the dry biotin acid chloride was added 9.6 g. of α-N-formyl-L-lysine as above. The flask was cooled in ice, and 25 cc. of ice-cold pyridine was added with shaking. The temperature was maintained at 0–5° C. for 20 minutes, then allowed to rise to room temperature over an additional 40 minute period. The clear orange solution was concentrated to dryness at reduced pressure, the residue dissolved in water and this evaporated again to remove most of the remaining pyridine. The residue was then washed with dilute hydrochloric acid and water, dissolved in 2% aqueous sodium bicarbonate solution, filtered and the filtrate adjusted to pH3 with hydrochloric acid. The light tan, gelatinous precipitate was washed with water and dried in vacuo over phosphorus pentoxide, to give ε-N-(D-biotinyl)-α-N-formyl-L-lysine. The benzylamine salt of this compound was made by suspending the free acid in methanol and adding benzylamine until all the solid material was in solution. Addition of ethyl ether precipitated an almost colorless salt and several reprecipitations in this manner yielded colorless crystals, having a melting point of 112–113° C.

*Analysis.*—Calculated for $C_{24}H_{37}O_5N_5S$: N, 13.80. Found: N, 13.50.

Preparation of ε-N-(D-biotinyl)-L-lysine (biocytin)

ε-N-(D-biotinyl)-α-N-formyl-L-lysine was dissolved in 6 N hydrochloric acid and heated at 65° C. for 30 minutes. The clear solution was then concentrated to dryness in vacuo, and the excess hydrochloric acid was removed by repeated addition of water and evaporation to dryness. The residue was triturated with water, and the aqueous extracts filtered and concentrated to dryness at reduced pressure. The residue was subjected to a 12-plate countercurrent distribution using an organic layer of equal parts chloroform and o-cresol and an aqueous layer of equal volume made pH 3 with hydrochloric acid. Plates 8 and 9 of this distribution were combined, ten volumes of petroleum ether added, and the organic layer washed several times with water. The combined water extracts were washed with ether and lyophilized. The residue of ε-N-(D-biotinyl)-L-lysine (biocytin) was dissolved in a minimum of water and precipitated as a white solid product by addition of acetone.

*Analysis.*—Calculated for $C_{16}H_{28}N_4O_4S$: C, 51.59; H, 7.58; N, 15.04. Found: C, 51.63; H, 7.18; N, 15.23.

It should be understood that various changes may be made in our process as herein described without affecting the results attained. Thus, various modifications of conditions as to time, temperature, alkalinity, acidity, etc., and various changes in procedure differing from those herein given as illustrative of the preferred embodiments of our invention may be made without departing from the scope thereof.

We claim:

1. The process for preparing ε-N-(D-biotinyl)-L-lysine that comprises reacting ε-N-carbobenzoxy-L-lysine with formic acid in the presence of acetic anhydride to form ε-N-carbobenzoxy-α-N-formyl-L-lysine, hydrogenating the latter compound to form α-N-formyl-L-lysine, condensing the product thus obtained with biotin acid halide at a temperature not higher than room temperature to form ε-N-(D-biotinyl)-α-N-formyl-L-lysine and hydrolyzing the same with a non-oxidizing dilute mineral acid to form ε-N-(D-biotinyl)-L-lysine.

2. The process for preparing ε-N-(D-biotinyl)-L-lysine that comprises reacting ε-N-carbobenzoxy-L-lysine with formic acid in the presence of acetic anhydride to form ε-N-carbobenzoxy-α-N-formyl-L-lysine, hydrogenating the latter compound to form α-N-formyl-L-lysine, condensing the product thus obtained with biotin acid chloride at a temperature not higher than room temperature to form ε-N-(D-biotinyl)-α-N-formyl-L-lysine, and hydrolyzing the same with dilute hydrochloric acid to form ε-N-(D-biotinyl)-L-lysine.

3. The process that comprises condensing α-N-formyl-L-lysine with biotin acid halide at a temperature not higher than room temperature to form ε-N-(D-biotinyl)-α-N-formyl-L-lysine.

4. The process that comprises hydrolyzing ε-N-(D-biotinyl)-α-N-formyl-L-lysine with a dilute mineral acid to form ε-N-(D-biotinyl)-L-lysine.

5. ε-N-(D-biotinyl)-α-N-formyl-L-lysine.

References Cited in the file of this patent

UNITED STATES PATENTS

| | | |
|---|---|---|
| 2,394,230 | Billman | Feb. 5, 1946 |
| 2,441,141 | Folkers et al. | May 11, 1948 |
| 2,442,681 | Folkers et al. | June 1, 1948 |
| 2,498,300 | Scott et al. | Feb. 21, 1950 |
| 2,515,320 | Sokol | July 18, 1950 |
| 2,519,038 | Galat | Aug. 15, 1950 |
| 2,519,530 | Wolf et al. | Aug. 22, 1950 |
| 2,570,297 | Weisblat et al. | Oct. 9, 1951 |

OTHER REFERENCES

Wright, Jr.: Am. Chem. Soc., 72, p. 1048 (1950).
Science, vol. 114, December 14, 1951, pp. 635–636.